Sept. 14, 1937.   J. F. HELLWEG   2,092,758
SEXTANT
Filed April 1, 1936   2 Sheets-Sheet 1
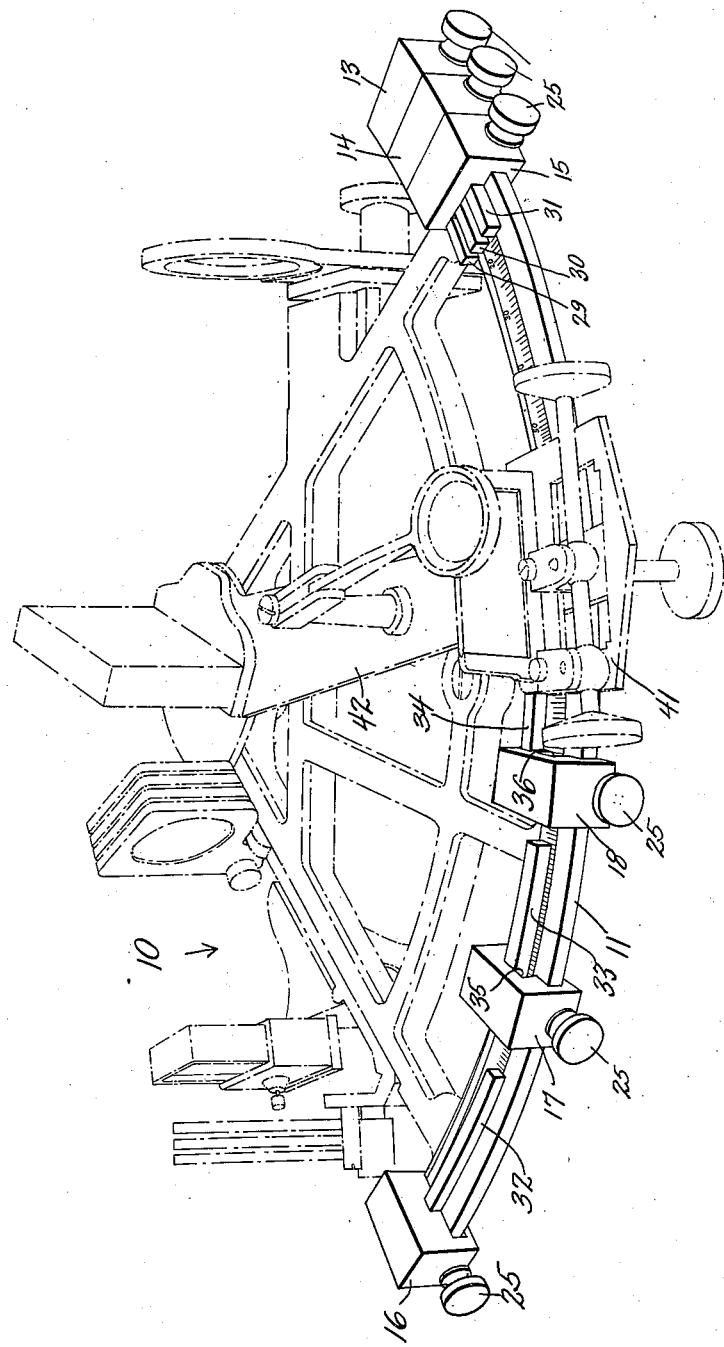
Fig. I.
INVENTOR
JULIUS F. HELLWEG.
BY
*Robert A. Lavender*
ATTORNEY Sept. 14, 1937.　　　J. F. HELLWEG　　　2,092,758
SEXTANT
Filed April 1, 1936　　　2 Sheets-Sheet 2

INVENTOR
JULIUS F. HELLWEG
BY
ATTORNEY

Patented Sept. 14, 1937

2,092,758

UNITED STATES PATENT OFFICE 2,092,758

SEXTANT

Julius F. Hellweg, United States Navy,
Washington, D. C.

Application April 1, 1936, Serial No. 72,151

12 Claims. (Cl. 33—70)

(Granted under the act of March 3, 1883, as amended April 30, 1928; 370 O. G. 757)

This invention relates to a sextant and has for an object to provide an improved sextant especially adapted for use in taking in succession a plurality of sights in a much shorter period of time than is possible with prior known sextants.

The ordinary sextant takes considerable time to take readings on several different astral bodies when it is necessary to observe a star, read the sextant, note the reading and the time of observation and to continue this process until all the observations and recordings are completed. This is especially true on smaller ships where the navigator taking the readings does not have skilled assistance available. As the ship is moving over the period of observations it will be apparent that the actual position of the ship at the time of the last sight will be at an appreciable distance from the position at the time of the first sight, making it necessary for further calculations and further plottings to be made to obtain an accurate fix. In running sounding lines in hydrographic surveys, where horizontal angles between observation stations are being measured, further calculations and further plottings must be made to allow for the advance of the sounding boat between the several observations required for each individual fix.

With the sextant of the present invention, readings on several astral bodies or observation stations may be taken and completed within the space of possibly a single minute whereby the ship or boat covers only such a short distance as to make unnecessary the adjustments to observations for advance. This facility becomes even more important in air navigation wherein the planes travel at such high rates of speed, thereby making it even more important that a plurality of readings be taken in as short a period of time as possible.

With the sextant of this invention, as illustrated, it becomes possible to take as many as six readings practically simultaneously, as compared to the previous time required.

With the foregoing and other objects in view, this invention comprises the combinations, construction, and arrangement of the parts hereinafter set forth, disclosed, illustrated on the accompanying drawings and claimed, and wherein:

Fig. 1 is a perspective view of a sextant embodying this invention;

Figure 4:
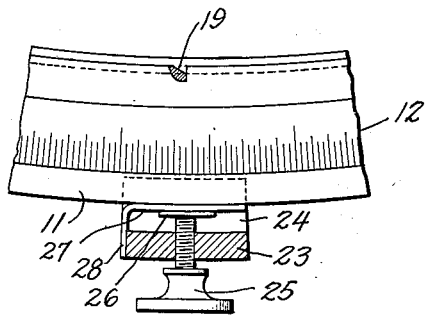
Fig. 4 is a partly broken away view of the trackway on the scale showing a section of the stop including the stop securing means.
Figure 5:
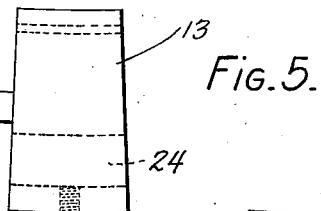
Figs. 5, 6, and 7 are top plan views of the outer, intermediate, and inner stops for one end of the scale bar.
Figure 7:
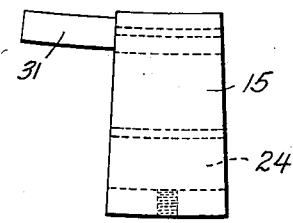
Figure 6:
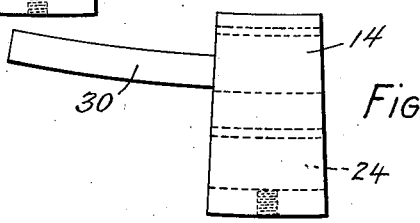

There is shown at 10 in dot-dash outline a representation of an ordinary sextant having the usual conventional parts thereto, all of which are used in the usual manner and hence need not be described here in detail. The scale bar 11 of the sextant 10 has been converted into a trackway 12 on which ride the stops 13, 14, and 15, similar stops 16, 17 and 18 being provided for the other end of the trackway 12. As will be observed in Fig. 4, the trackway is formed by providing an undercut slot 19 on the rear of the scale bar 11. The securing means of each of the stops 13 to 18 is identical and consists of a depending undercut flange 20 of a shape and size to correspond with the undercut slot 19 on the trackway 12 and adjacent this undercut flange is a supporting rear foot 21 which rides on the top of the trackway. On the other edge of the trackway a front foot 22 joins a depending leg 23 from which extends an underarm 24. Threaded through the leg 23 is a thumb screw 25 having a rubbing plate 26 pressing against an angle spring 27, one leg 28 of the angle spring 27 being secured to one side of the leg 23. By tightening the thumb screw 25, the rubbing plate 26 will press the spring 27 against the side of the trackway 12, thereby holding the stop immovable along the scale bar 11. After loosening the thumb screw 25, the stop may be slid easily on the trackway 12 over the scale 11, as may be desired. Each of the stops 13 to 18 is provided with a projecting finger. The stops 13 and 16 each have the longest projecting finger, the fingers being arcuate and of the same curvature as the scale bar 11. The finger 29 on stop 13 is slightly longer than the combined width of the stop 14 and the length of its finger 30, and this, in turn, is slightly longer than the combined width of the stop 15 and the length of its finger 31. Similarly, the finger 32 on stop 16 is slightly longer than the combined width of the stop 17 and the length of its finger. The finger 33 on stop 18 is slightly longer than the combined width of the stop 18 and the length of its finger 34. The stops 14 and 17 are cut away so as to allow the fingers 32 and 30 to freely project thereunder and the stops 18 and 15 are each cut away to permit fingers 30 and 31 and fingers 32 and 33 to extend thereunder. That is, stop 17 is cut away at 35 for a greater distance than the width of the finger 32 while the stop 18 is cut away at 36 for a distance slightly greater than the combined width of the fingers 32 and 33. The finger 32 may, therefore, pass freely through stops 17 and 18 and extend beyond the ends of the fingers 33 and 34 and, similarly, the finger 33 may pass through the stop 18 and extend slightly beyond the finger 34. The same is true of the fingers 29, 30 and 31, on stops 13, 14 and 15. Either set of stops or both sets of stops may be used at one group of readings. If only one set of stops is to be used, the other set may be removed by turning the lock screws 37 or 38 at the corresponding end of the trackway 12 until its cut away end 39 or 40 is in coincidence with the end of the undercut slot 19, permitting the stops to slide off the trackway and be removed therefrom.

Figure 3:
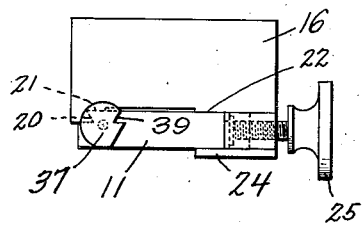
Fig. 3 is a similar view of the left end of the sextant scale bar.
Figure 2:
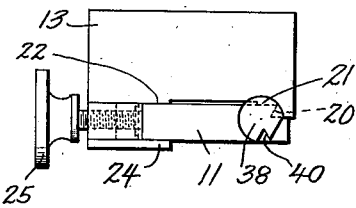
Fig. 2 is an enlarged elevational view of the right end of the sextant scale bar, with the end stop moved against it.

In operation, the stops being used will be slid to the end of the trackway adjacent the lock screws 37 and 38 which are turned to the locking positions shown in Figs. 2 and 3. Then, starting with either the highest or lowest astral body, depending upon which set of stops is being used, a sight is taken in the customary manner. When the altitude adjustment of the alidade is made, instead of taking a reading on the scale, the whole set of stops will be slid along the trackway until the end of the finger of the furthermost stop abuts against the reading frame 41 of the alidade 42. The set screw 25 is then tightened to hold this stop in that position. The altitude adjustment of the alidade for the next lower astral body is then made and the intermediate stop is moved to bring its finger against the alidade and fixed into position by tightening the thumb screw. The process is repeated on the third astral body, bringing the third stop against the alidade and then tightening it into position. If more readings are to be taken at the same time, the same process is repeated with the three stops at the other end. Obviously, instead of using only the stops at the other end, the outermost stops at each end may be used in succession, then the intermediate stops and the innermost stops, depending on the astral bodies that are being observed. Due to the rapidity with which this can be accomplished, the time of taking the last sight need only be observed, or if greater accuracy is desired than the time of commencing the first sight and the time of finishing the last sight may both be observed, and the mean time is used as the time of the sights. After the positions of the alidade have been thus recorded by means of the stops, the navigator using the same may then take the sextant into the chart room and set the alidade against the end of the finger of the innermost stop and observe and record the reading of the alidade by the vernier in the usual way. The innermost stop is then released and the alidade is moved against the finger of the next stop. The process is continued until all the sights are read and recorded.

Although the stops have just been described for use in navigation, they are equally serviceable when the sextant is used in taking a plurality of horizontal angles in succession in coast and geodetic surveying where the stops similarly serve to register more rapidly and accurately the angles between observation stations.

It will be obvious that the stops may be provided on a trackway, separate from the scale bar; that is, instead of converting the scale into a trackway on which the stops may slide, another trackway may be provided parallel to and concentric with the scale and on which the stops would operate in an identical manner.

Although this invention has been shown and illustrated in a particular form, it will be understood that it is not limited to the particular details hereinbefore disclosed and illustrated, except as required by the scope of what is claimed.

The invention described herein may be manufactured and used by or for the Government of the United States of America for governmental purposes without the payment of any royalties thereon or therefor.

I claim:

1. In a sextant, a trackway formed as a part of the sextant parallel to or concentric with the sextant scale, and a plurality of movable stops cooperating with the sextant alidade on said trackway.

2. In a sextant, a trackway formed as a part of the sextant parallel to or concentric with the sextant scale, and a plurality of movable stops on said trackway, said stops being selectively movable to abut against the alidade of said sextant to register the position thereof.

3. In a sextant, a trackway formed as a part of the sextant parallel to or concentric with the sextant scale, and a plurality of movable stops cooperating with the sextant alidade on said trackway, said trackway being formed on the sextant scale.

4. In a sextant, a trackway formed as a part of the sextant parallel to or concentric with the sextant scale, a plurality of movable stops cooperating with the sextant alidade on said trackway, and lockable means at the end of the trackway detachably retaining said stops thereon.

5. In a sextant, a trackway formed as a part of the sextant parallel to or concentric with the sextant scale, and a plurality of movable stops on said trackway, said stops being selectively movable to abut against the alidade of said sextant to register the position thereof, each stop having an arcuate finger extending in the direction of the alidade.

6. In a sextant, a trackway formed as a part of the sextant parallel to or concentric with the sextant scale, and a plurality of movable stops on said trackway, said stops being selectively movable to abut against the alidade of said sextant to register the position thereof, each stop having an arcuate finger extending in the direction of the alidade, the finger of the outermost stop being at least as long as the combined width of the innermost stop and the length of its extending finger.

7. In a sextant, a trackway formed as a part of the sextant parallel to or concentric with the sextant scale, and a plurality of movable stops on said trackway, said stops being selectively movable to abut against the alidade of said sextant to register the position thereof, each stop having an arcuate finger extending in the direction of the alidade, the finger of the outermost stop being at least as long as the combined width of the innermost stop and the length of its extending finger, the inner stops being cut away to allow the outer fingers to extend therethrough.

8. In a sextant, a trackway formed as a part of the sextant parallel to or concentric with the sextant scale, a plurality of movable stops on said trackway, said stops being selectively movable to abut against the alidade of said sextant to register the position thereof, and means on each stop for detachably fixing it in position along the trackway.

9. A sextant comprising a graduated element, a member movable relative to said element, a stop movable relative to said element and means for fixing said stop at different positions.

10. A sextant comprising a graduated element, a member movable relative to said element, a plurality of stops movable relative to said element, and means for successively fixing each of said stops at different positions.

11. A sextant comprising a graduated element, a member movable relative to said element, a stop movable relative to said element, and means for fixing said stop at different positions in the path of said movable member.

12. A sextant comprising a graduated element, a member movable relative to said element, a plurality of stops movable relative to said element, and means for successively fixing each of said stops at different positions to register different successive positions of said movable member.

JULIUS F. HELLWEG.